(12) United States Patent
Hardacker et al.

(10) Patent No.: US 8,792,058 B2
(45) Date of Patent: Jul. 29, 2014

(54) SYSTEM AND METHOD FOR PRESENTING GUIDE DATA ON A REMOTE CONTROL

(75) Inventors: Robert Hardacker, Escondido, CA (US); Steven Richman, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 611 days.

(21) Appl. No.: 11/948,700

(22) Filed: Nov. 30, 2007

(65) Prior Publication Data

US 2009/0141174 A1  Jun. 4, 2009

(51) Int. Cl.
*H04N 5/44* (2011.01)
*H04N 5/445* (2011.01)

(52) U.S. Cl.
USPC .......................................... 348/734; 348/563

(58) Field of Classification Search
CPC ................... H04N 2005/441; H04N 21/4355; H04N 21/84; H04N 5/4403
See application file for complete search history.

(56) References Cited

U.S. PATENT DOCUMENTS

| | | | |
|---|---|---|---|
| 6,130,726 A | 10/2000 | Darbee et al. | |
| 6,192,341 B1 * | 2/2001 | Becker et al. | 704/271 |
| 6,437,836 B1 | 8/2002 | Huang et al. | |
| 6,476,825 B1 | 11/2002 | Croy et al. | |
| 6,577,350 B1 | 6/2003 | Proehl et al. | |
| 6,765,557 B1 | 7/2004 | Segal et al. | |
| 6,980,821 B2 | 12/2005 | Balasuriya et al. | |
| 6,985,524 B1 * | 1/2006 | Borchers | 375/240 |
| 8,019,271 B1 * | 9/2011 | Izdepski | 455/3.01 |
| 2002/0184625 A1 * | 12/2002 | Allport | 725/39 |
| 2003/0035074 A1 | 2/2003 | Dubil et al. | |
| 2003/0117427 A1 * | 6/2003 | Haughawout et al. | 345/710 |
| 2004/0168187 A1 * | 8/2004 | Chang | 725/40 |
| 2004/0205627 A1 * | 10/2004 | Rosenholtz et al. | 715/526 |
| 2005/0028208 A1 * | 2/2005 | Ellis et al. | 725/58 |
| 2005/0273805 A1 * | 12/2005 | Roever et al. | 725/25 |
| 2006/0161956 A1 * | 7/2006 | Wasilewski et al. | 725/58 |
| 2006/0218490 A1 * | 9/2006 | Fink | 715/517 |
| 2007/0174791 A1 * | 7/2007 | Park et al. | 715/838 |
| 2008/0086688 A1 * | 4/2008 | Chandratillake et al. | 715/719 |
| 2010/0153998 A1 * | 6/2010 | Paik et al. | 725/39 |
| 2010/0154000 A1 * | 6/2010 | Macrae et al. | 725/41 |
| 2010/0313215 A1 * | 12/2010 | McCoskey et al. | 725/31 |
| 2011/0051018 A1 * | 3/2011 | Shintani et al. | 348/734 |
| 2011/0162010 A1 * | 6/2011 | Ellis et al. | 725/40 |

FOREIGN PATENT DOCUMENTS

JP  10-171757  *  6/1998  ............. G06F 15/00

OTHER PUBLICATIONS

JP10-171757 Machine translation, Jun. 1998, all.*

* cited by examiner

*Primary Examiner* — Rong Le

(74) *Attorney, Agent, or Firm* — Fitch, Even, Tabin, Flannery LLP

(57) ABSTRACT

System and method for displaying guide data on a remote control. In one embodiment, guide data may be received in a first format by the remote control. The guide data may be converted from the first format to a second format based in part on a predefined user preference. A portion of the guide data may be displayed in accordance with the second format on a display of the remote control such that guide data is displayed according to a first scale.

15 Claims, 4 Drawing Sheets

SYSTEM AND METHOD FOR PRESENTING GUIDE DATA ON A REMOTE CONTROL

FIELD OF THE INVENTION

The present invention relates in general to a method and apparatus for displaying guide data on a remote control and more particularly to presenting guide data on a remote control such that readability is facilitated.

BACKGROUND

Guide data, such as a program title, program synopsis, actors and year of production, may be presented to users for selecting programming and navigating channels broadcasted to display devices. Traditional television broadcasting devices have enabled transport of guide data by broadcast transport streams in the form of a dedicated channel providing an on-screen program guide. Additionally, guide data may also be provided through broadcast transport streams to display devices and middleware, such as set top boxes, for presentations to users via a graphical user interface. Graphical user interfaces may allow for browsing program summaries, searching for programs or channels, and access to a selected program. However, such conventional methods of presenting guide data are limited by the inability to present data to viewers in a readable fashion. Conventional methods present guide data as text conforming to a fixed size which may be appropriate for some instances. However, presenting guide data having a fixed text size and/or fixed number of channel listings is not suitable for conveying guide data for multiple screen sizes and or use at multiple viewing distances. Additionally, conventional presentation of guide data may fail for displays of smaller dimensions. For example, guide data for a larger screen will be displayed at a much smaller scale on screens of reduced dimension. Further, conventional methods do not address presentation of guide data on a small display such as a remote control.

In addition, conventional methods for presentation of guide data do not address requirements for all users, particularly the visually impaired. Users having visual impairments, such as reduced vision and/or color blindness may not be able to read conventional program guides. Further, conventional program guides may not allow for customization of program guide display.

While conventional program guides provide guide data for displays, such program guides struggle to meet requirements for display on screens of small dimension or to meet the needs of the visually impaired.

BRIEF SUMMARY OF THE INVENTION

Disclosed and claimed herein are a system and method for displaying guide data on a remote control. In one embodiment, guide data may be received in a first format by the remote control. The guide data may be converted from the first format to a second format based in part on a predefined user preference. A portion of the guide data may be displayed in accordance with the second format on a display of the remote control. Additionally, guide data may be displayed according to a first scale.

Other aspects, features, and techniques of the invention will be apparent to one skilled in the relevant art in view of the following detailed description of the invention.

BRIEF DESCRIPTION OF THE DRAWINGS

FIGS. 6A-6C depict a graphical representations of remote control displays according to one or more embodiments of the invention.

DETAILED DESCRIPTION OF EXEMPLARY EMBODIMENTS

Figure 1B:
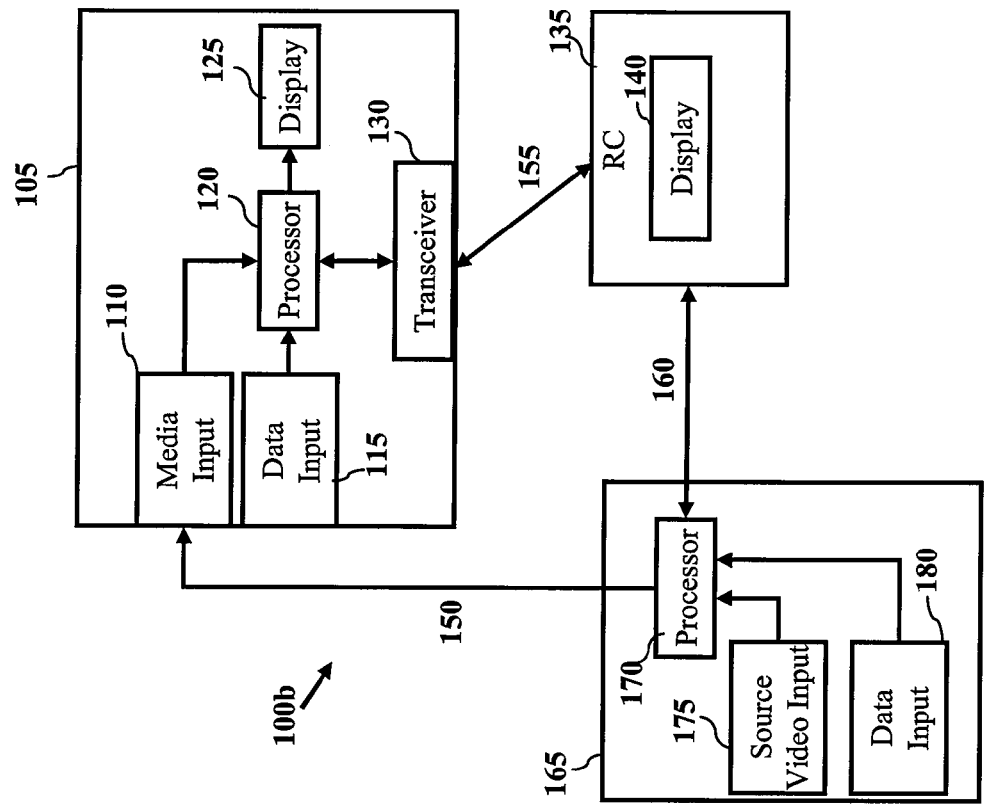
FIGS. 1A-1B depict embodiments of simplified system diagrams of one or more aspects of the invention.

One aspect of the present invention is directed to displaying guide data on a remote control. In one embodiment, the invention relates to a system having a remote control for video signal processing logic or a display device. The remote control may be configured to issue commands to the display device. In one embodiment, the remote control may be configured to receive guide data from the display device. The remote control may be configured to display guide data associated with video content received by the display device. For example, guide data such as a channel identifier, program title, program synopsis, actor name, director name, category (e.g., comedy, drama, etc.), ratings and/or year of production may be presented on a display of the remote control. According to another embodiment, the remote control may be interoperated with a component of a video signal interface, such as a set top box. The remote control may thereby be configured to display guide data associated with video content received by the video signal interface.

According to another embodiment, a process may provide guide data from signal processing logic of a video signal interface to a remote control. In one embodiment, guide data carried by broadcast transport streams and/or a separate data channel may be separated and processed for transmission to a remote control. The guide data may be transmitted to the remote control in a first format. For example, a video signal may be transmitted to a remote control. According to another embodiment, the guide data may be converted to a second format and displayed on a remote control display. The guide data may be converted to the second format based on a user preference. User preferences may correspond to at least one of a font type, font size, color for text, background color, edge enhancement and contrast ratio.

Another aspect of the invention is to improve readability of guide data presented on a remote control. Guide data transmitted in broadcast streams may not be formatted for a display employed by a remote control. Thus, guide data may be formatted according to one or more embodiments of the invention. In one embodiment, guide data may be scaled appropriately according to dimensions of a remote control display. According to another embodiment, display settings for at least one of font, font color, background color and font size may be selectable by a user. In yet another embodiment, guide data may be optimized for a remote control display. Additionally, guide data presented on a remote control may be selectively enlarged according to another embodiment of the invention. For example, a user may selectively enlarge guide data presented on a remote control. In yet another embodiment, guide data may be displayed with a distorted appearance usable to compensate for vision anomalies (e.g., astigmatism, myopia, etc.). In that fashion, a remote control may be provided facilitating display of guide data for the visually impaired.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. The code segments may be downloaded via computer networks such as the Internet, Intranet, etc.

Figure 1A:
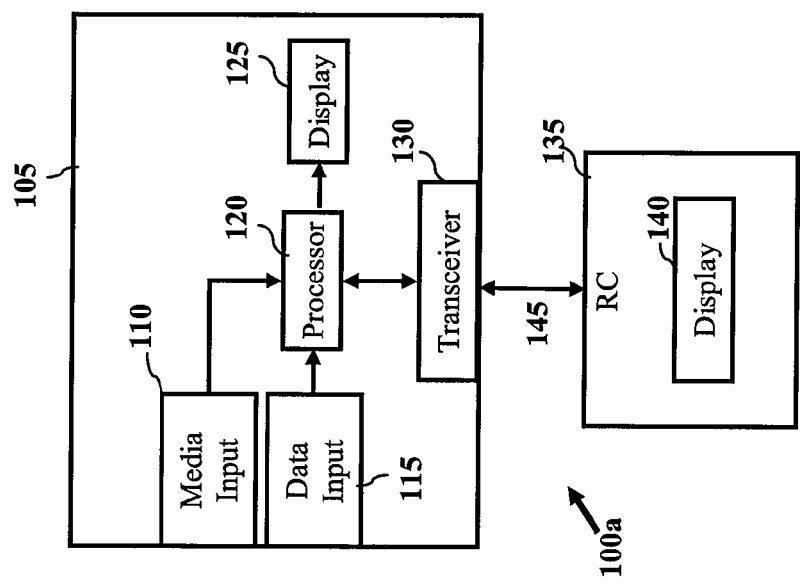

Referring now to the drawings, FIGS. 1A-1B illustrate simplified system diagrams capable of implementing one or more aspects of the invention. As shown in FIG. 1A, system 100a includes a display device 105 which may be in communication with remote control 135 via wireless link 145. Display device 105 may correspond to one of a television and display in general. As shown, display device 105 includes a processor 120 coupled to media input 110, data input 115, display 125 and transceiver 130. It may be appreciated that processor 120 can be any type of processor such as a microprocessor, field programmable gate array (FPGA), and/or an application specific integrated circuit (ASIC). Display device 105 may receive broadcast streams via media input 110. In one embodiment, display device 105 may be configured to receive media corresponding to a multitude of forms (e.g., National Television Standards Committee (NTSC), PAL, Digital Satellite System (DSS), Digital Broadcast system (DBS), Advanced Television Standards Committee (ATSC), Internet Protocol Television (IPTV), etc.). Similarly, display device 105 may be configured to receive recorded media including at least one of personally recorded video and pre-recorded video. It may be appreciated the recorded media received by display device 105 may be retrievable from at least one of hard disk drives (HDD), video libraries and/or optical storage disks (e.g., DVDs, Blu-Ray™Disks, HD-DVDs, CD-ROMs, etc.) Broadcast streams received at media input 110 may be output to display 125 by processor 120. According to another embodiment, data input 115 may be configured to receive data, which may include guide data, from a separate data channel. For example, data input 115 may be coupled to one of a telephone line, Ethernet line and a fiber optic data line.

According to another embodiment of the invention, processor 120 may be configured to extract guide data from broadcast streams received at media input 110 and/or data streams received at data input 115. As such, display device 105 may be configured to present a dedicated channel of a received broadcast stream providing a program guide to display 125. According to another embodiment, processor 120 may be configured to decode guide data embedded in a broadcast transport stream. Guide data received by display device 105 may be displayed as a electronic program guide by display 125 according to one embodiment of the invention. For example, display 125 may provide a graphical user interface for browsing program summaries, searching for programs or channels, and access to a selected program with a received broadcast stream. In another embodiment of the invention, display device 105 may receive commands from remote control 135 for navigating presented guide data. To that end, remote control 135 may be configured to issue commands to the display device 105 such as selecting a broadcast channel, adjusting volume, turning display device 105 on/off, etc.

According to another embodiment, display device 105 may transmit guide data to remote control 135. In one embodiment, display device 105 may be configured to transmit guide data as a video signal. According to another embodiment, display device 105 may be configured to convert guide data received by a broadcast stream to computer readable text. In that fashion, display device 105 may transmit guide data as computer readable text to remote control 135. Guide data received by remote control 135 from display device 105 may be formatted for display on remote control display 140. Display of guide data on remote control display 140 may be based on a user preference as will be described below in more detail with reference to FIG. 3.

Referring now to FIG. 1B, system 100b is depicted according to another embodiment of the invention. As shown, system 100b includes a display device 105 electrically coupled to a video signal interface 165 via data link 150. In one embodiment, video signal interface 165 may correspond to a set top box, television tuner or any television middleware device in general. As shown, video signal interface 165 includes processor 170 coupled to source video input 175 and data input 180. Video signal interface 165 may be configured to provide broadcast media received via source video input 175 to media input 110 of display device 105 via data link 150. Datalink 150 may be one of a wired and wireless data link. As such, media received by source video input 175 may be transferred to display device 105 for display. According to another embodiment, video signal interface 165 may be configured to process media received by source video input 175 prior to transferring to display device 105. For example, processor 170 may be configured to decode media received by source video input 175 into a readable format for display device 105.

According to another embodiment, processor 170 of video signal interface 165 may be configured to decode guide data embedded in a received broadcast transport stream. Guide data received by video signal interface 165 may be provided to display device 105 as a electronic program guide. According to another embodiment, video signal interface 165 may be configured to transmit guide data to remote control 135. In one embodiment, video signal interface 165 may be configured to transmit guide data as a video signal to remote control 135. According to another embodiment, video signal interface 165 may be configured to convert guide data received by a broadcast stream to computer readable text. In that fashion, video signal interface 165 may then transmit guide data as computer readable text to remote control 135. In yet another embodiment, processor 170 may be configured to compress received guide data prior to transmitting. In that fashion, video signal interface 165 can transmit compressed guide data.

Guide data received by remote control 135 from video signal interface 165 may be displayed on remote control display 140. Guide data transmitted from video signal interface 165 may provide a graphical user interface for browsing program summaries, searching for programs or channels, and access to a selected program with a received broadcast stream. In another embodiment of the invention, video signal interface 165 may receive commands from remote control 135 for navigating presented guide data. To that end, remote control 135 may be configured to issue commands to the video signal interface 165 such as selecting a broadcast channel, adjusting volume, turning video signal interface 165 on/off, etc.

Continuing to refer to FIG. 1B, remote control 135 may be electrically coupled to display device 105 and/or video signal interface 165 via data links 155 and 160 respectively. Data links 155 and 160 may be wireless data links according to one embodiment of the invention. In one embodiment, data links 155 and 160 may be radio frequency (RF) link. As such, remote control 135 may be configured to control features of display device 105. Further, remote control 135 may be configured to interoperate with an intermediary device such as video signal interface 165.

Figure 2:
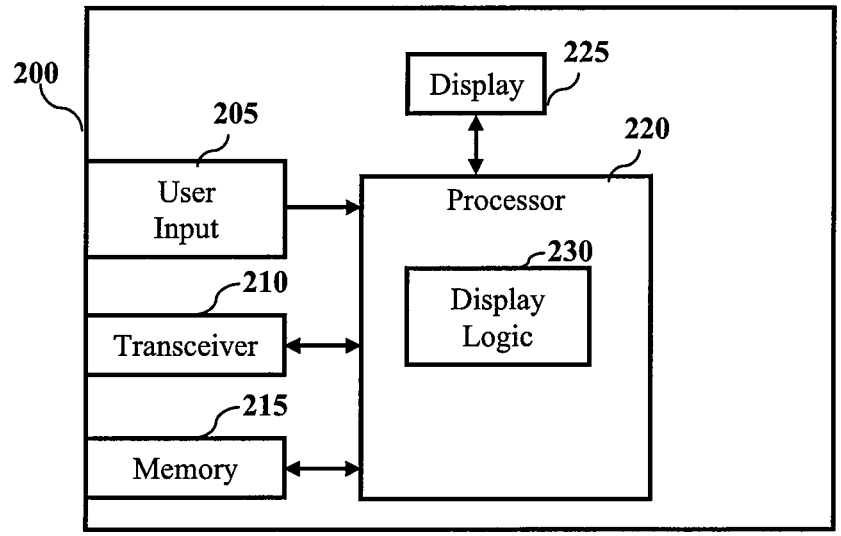
FIG. 2 depicts a simplified block diagram of a remote control according to one or more embodiments of the invention.

Referring now to FIG. 2, remote control 200 is shown as another embodiment of the remote control 135 of FIG. 1. As shown, remote control 200 includes a processor 220 coupled to user input 205, transceiver 210, memory 215 and display 225. In one embodiment, user input 205 may comprise a plurality of terminals which may be employed by a user to operate remote control 200. Similarly, user input 205 may include a plurality of hard and/or soft keys which may be used for operating remote control 200. In that fashion, remote control 200 may be configured to control a display device (e.g., display device 105) or video signal interface (e.g., video signal interface 165). Commands entered on user input 205 of remote control 200 may be wirelessly transmitted using transceiver 210. According to another embodiment, user input 205 may be employed for programming remote control 200 for operation with a particular display device (e.g., display device 105) or video signal interface (e.g., video signal interface 165). In yet another embodiment, user input 205 may be employed for entering user preferences for display of guide data as will be described below with more detail in reference to FIG. 3. It may be further appreciated that remote control 200 may be configured to store user preference data in memory 215.

According to another embodiment, transceiver 210 may be configured to receive data including, but not limited to, guide data. Guide data received by transceiver 210 may be provided to display logic 230 of processor 220. In one embodiment, display logic 230 may include processor executable instructions for presenting guide data on display 225. Presentation of guide data on display 225 may be associated with a predefined user preference. Remote control 200 may be configured to format received guide data for presentation on display 225 as will be described below in more detail with reference to FIG. 3. According to another embodiment, remote control 200 may be configured to receive and display additional information including but not limited to, date, news alerts, weather information, messages, advertisements, etc.

Figure 3:
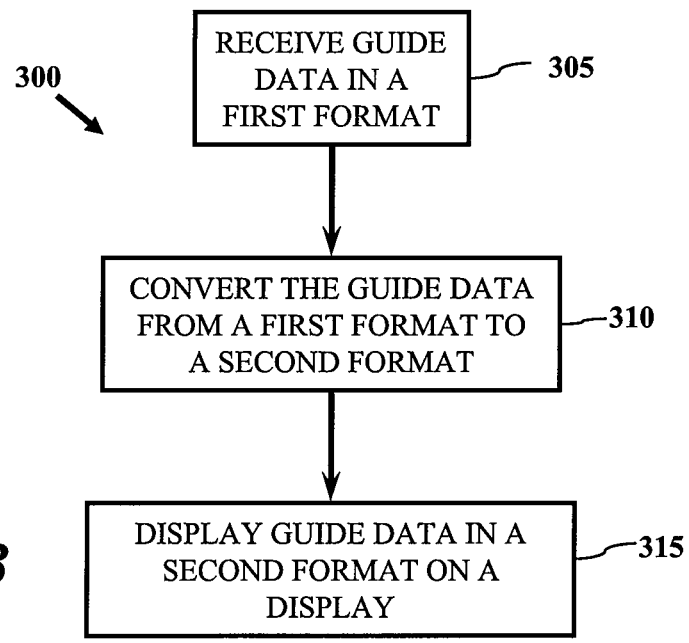
FIG. 3 depicts a process according to one or more embodiments of the invention.

Referring now to FIG. 3, process 300 is shown for displaying guide data according to one or more embodiments of the invention. In one embodiment, process 300 may include receiving guide data at block 305 for at least one broadcast channel. Guide data may be received by one of a display device (e.g., display device 105), video signal interface (e.g., video signal interface 165), or by a remote control (e.g., remote control 200). In one embodiment, received guide data may correspond to a first format, such as guide data embedded in a broadcast transport stream. Similarly, guide data may be received as a video signal stream. The received guide data may be converted from the first format to a second format, as shown in block 310, based in part on a predefined user preference. For example, received guide data may be converted to computer readable text. The second format may correspond to formatted text characterized by at least one of a predefined font, text size, color and contrast in accordance with at least one user preference. Process 300 may follow with displaying the guide data according to the second format on a display (e.g., display 225) of a remote control (e.g., remote control 200), as shown in block 315. Additionally, guide data displayed in a second format may correspond to a first scale. Further, displayed guide data may be enlarged to a second scale as will be described below in more detail with reference to FIGS. 6A-C. It may also be appreciated that displaying guide data in the second format corresponds to a distorted view to compensate for vision anomalies. For example, process 300 may display guide data having a distorted appearance in block 315. In that fashion, users with a vision impairment (e.g., astigmatism, myopia, etc.) may benefit from presentation of guide data within a display (e.g., remote control display 140).

Figure 4:
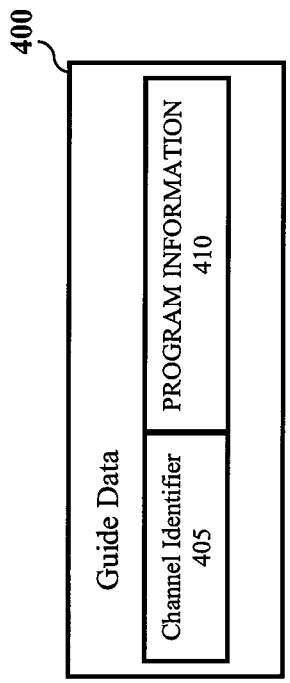
FIG. 4 depicts a graphical representation of guide data according to one embodiment of the invention.

FIG. 4 depicts a simplified graphical representation of guide data 400 according to one or more embodiments of the invention. In one embodiment of the invention, guide data 400 may be received for each channel of the broadcast stream. In one embodiment, guide data 400 may include a channel identifier 405 corresponding to a name and/or channel number associated with a channel received in a broadcast stream. In another embodiment, guide data 400 may provide program information 410 providing at least one program data to convey upcoming programming information, a channel identifier, program title, program synopsis, actor name, director name, category (e.g., comedy, drama, etc.), ratings, year of production, data to upgrade manufacturers' display devices, metadata and/or user accessible data. According to another embodiment of the invention, guide data may be captured from a dedicated video channel by one of a display device (e.g., display device 105), video signal interface (e.g., video signal interface 165), and a remote control (e.g., remote control 200). In that fashion, guide data from a dedicated video channel may be captured and formatted as computer readable text providing a guide data element 400 for each channel. For example, one of a display device (e.g., display device 105), video signal interface (e.g., video signal interface 165), and a remote control (e.g., remote control 200) may be configured to perform character recognition of a video signal and convert recognized characters to computer readable text for display on a remote control display (e.g., display 225). In one embodiment, guide data may be converted to ASCII code. However it may be appreciated that other computer readable codes may be employed by the invention.

Figure 5:
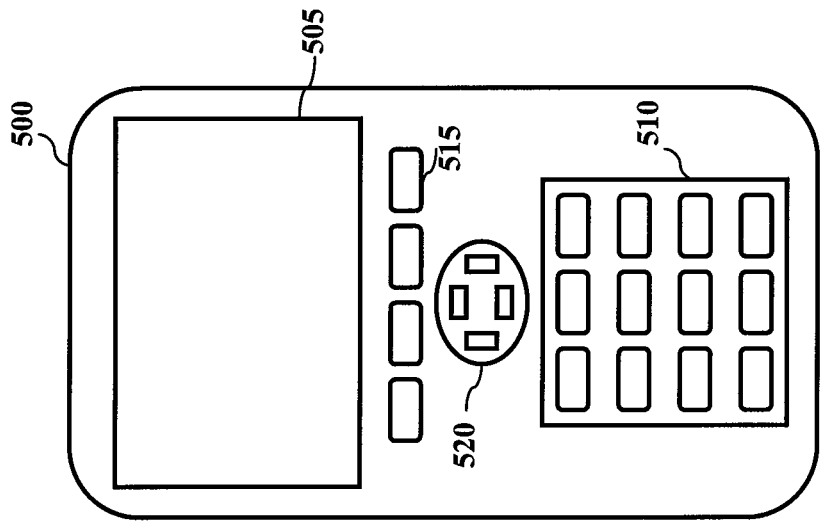
FIG. 5 depicts a remote control according to one or more embodiments of the remote control of FIG. 2.

Referring now to FIG. 5, a graphical representation of remote control 500 is shown as another embodiment of the remote control 135 of FIG. 1. As shown, remote control 500 includes display 505, user interface 510 (e.g., user input 205), directional terminals 520 and secondary terminals 515. Remote control 500 may be configured to present guide data on display 505. In one embodiment, display 505 may be a liquid crystal display (LCD). However, it may be appreciated that other types of displays may be employed by remote control 500. Guide data may be presented on display 505 based in part on a predefined user preference. At least one of user interface 510, directional terminals 520 and secondary terminals 515 may be configured to enter user preferences into remote control 500, which may be stored by remote control memory (e.g., memory 215 of FIG. 2). In one embodiment, user interface 510 may be employed by a user of remote control 500 to issue commands to one of a display device (e.g., display device 105) and a video signal interface (e.g., video signal interface 165). Directional terminals 520 may be configured for navigating guide data presented on display 505. For example, directional terminals 520 may be employed for browsing program summaries, searching for programs or channels, and access to a selected program with a received broadcast stream. In another embodiment of the invention, secondary terminals 515 may be embodied as hard or soft keys for operating remote control 500 in general.

Figures 6A, 6B, 6C:
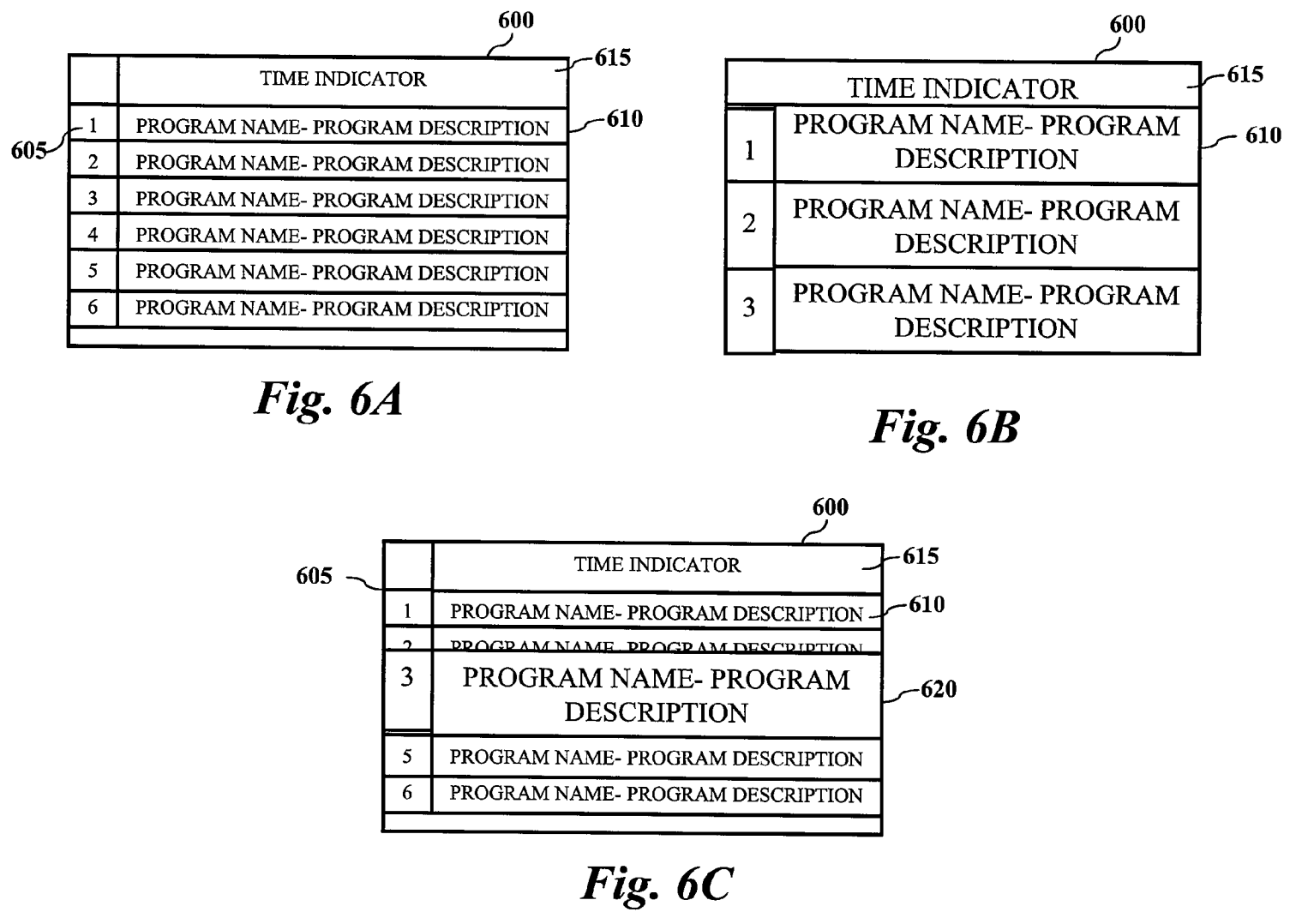

Referring now to FIGS. 6A-C, a graphical representation is provided of a guide data presented on a remote control display 600 according to one or more embodiments of the invention.

Referring first to FIG. 6A, a graphical representation is shown of guide data presented in display 600. According to one embodiment, display 600 may be configured to provide guide data for a plurality of channels associated with a broadcast stream. For each channel, display 600 may present a channel identifier 605. Similarly, display 600 may present program information 610 for each channel. As shown, display 600 may present a plurality of channel identifiers 605 and a plurality of program identifiers 610. According to another embodiment, display 600 may include a time indicator 615 providing a reference for start and/or end times for programs within a broadcast stream. As shown in FIG. 6A, guide data is presented in accordance with a first scale. Guide data presented on display 600 may be based in part on user preferences stored by a remote control memory (e.g., memory 215). It may be appreciated that display preferences may be one of user defined display preferences and a system generated preset presentation. Additionally, guide data is arranged in a grid like arrangement. It may be appreciated that additional arrangements may be employed. Further, it may be appreciated that display 600 may be configured to display additional information including but not limited to date, news alerts, weather information, messages, advertisements, etc.

According to one embodiment of the invention, users of a remote control may enlarge guide data presented by display 600. To that end, FIG. 6B shows guide data being presented enlarged to a second scale which is larger than the first scale of FIG. 6A, in accordance with certain embodiments of the invention. As shown in FIG. 6B, a sub-set of guide data is enlarged. According to another embodiment, program information 610 may be preserved though enlargement. Text wrapping may be employed to preserve enlarged guide data within in a display panel. As shown in FIG. 6B, guide data is enlarged and preserved within display 600. A user may be able to enlarge program information 610 using a user input (e.g., user interface 510) of a remote control (e.g., remote control 500).

According to another embodiment, enlarging presentation of guide data may correspond to enlarging program information of a single channel 620 as shown in FIG. 6C. In that fashion, guide data of a single channel is shown in an enlarged state which may facilitate readability according to one embodiment of the invention. As shown the scale of program information 620 is larger than the first scale of program information 610. A user may be able to enlarge program information 610 using a user input (e.g., user interface 510) of a remote control (e.g., remote control 500). Further, a user may be able to change enlarged program information 620 to a different channel using user input (e.g., user interface 510) of a remote control (e.g., remote control 500). In that fashion, users with a visual impairment may benefit from presentation of guide data within display 600.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method comprising:
    receiving guide data for at least one broadcast channel, the guide data corresponding to a first visual display format corresponding to displaying the guide data on a first display device and the guide data including data to upgrade manufacturers' display devices;
    converting by a processing device at least a portion of the received guide data from the first visual display format to a second visual display format based at least in part on a predefined user display preference, the second visual display format corresponding to displaying at least a portion of the converted guide data on a second display device in a first visual scale and the second visual display format corresponding to formatted text characterized by at least one of edge enhancement and contrast ratio, wherein the second display device is a display of a remote control of the first display device and is smaller than the first display device, and wherein converting comprises enlarging at least one channel listing of the at least one broadcast channel to an enlarged second visual scale;
    displaying on the second display device the at least one enlarged channel listing in the enlarged second visual scale; and
    displaying on the second display device at least one other channel listing of the at least one broadcast channel in the first visual scale.

2. The method of claim 1, wherein the received guide data comprises a news alert.

3. The method of claim 1, wherein the second visual display format compensates for at least one of astigmatism and myopia.

4. The method of claim 1 wherein displaying on the second display device the at least one enlarged channel listing in the enlarged second visual scale and displaying on the second display device at least one other channel listing of the at least one broadcast channel in the first visual scale further comprises:
    displaying simultaneously on the second display device the at least one enlarged channel listing in the enlarged second visual scale and the at least one other channel listing in the first visual scale.

5. The method of claim 1 wherein the guide data comprises a video signal stream and wherein converting by the processing device the at least a portion of the received guide data further comprises:
    performing character recognition on at least a portion of the video signal stream to extract at least a portion of the received guide data from the video signal stream;
    converting at least a portion of the extracted guide data to computer readable text guide data; and
    converting the computer readable text guide data to the second visual display format.

6. An apparatus comprising:
    a first display;
    a memory configured to store predefined user display preferences;
    a transceiver configured to receive guide data corresponding to a first visual display format corresponding to displaying the guide data on a second display, the second display configured to be remotely controlled by the apparatus, and wherein the guide data includes data to upgrade manufacturers' display devices;
    a processor coupled to the first display, transceiver and memory, the processor configured to:
        convert at least a portion of the received guide data from the first visual display format to a second visual display format corresponding to displaying at least a portion of the converted guide data on the first display in a first visual scale based at least in part on a predefined user display preference and the second visual display format corresponding to formatted text characterized by at least one of edge enhancement and contrast ratio, wherein converting comprises enlarging at least one channel listing of the received guide data to an enlarged second visual scale, display on the first display the at least one enlarged channel listing in the enlarged second visual scale, and display on the first display at least one other channel listing of the received guide data in the first visual scale.

7. The apparatus of claim 6, wherein the received guide data comprises a news alert.

8. The apparatus of claim 6, wherein the second visual display format compensates for at least one of astigmatism and myopia.

9. The apparatus of claim 6, wherein the processor is configured to:

display simultaneously on the first display the at least one enlarged channel listing in the enlarged second visual scale and the at least one other channel listing in the first visual scale.

10. The apparatus of claim 6 wherein the guide data comprises a video signal stream, and wherein the processor is further configured to:

perform character recognition on at least a portion of the video signal stream to extract at least a portion of the received guide data from the video signal stream;

convert at least a portion of the extracted guide data to computer readable text guide data; and convert the computer readable text guide data to the second visual display format.

11. An apparatus comprising:

a remote control in electrical communication with a video signal processor, the video signal processor configured to receive video data from a broadcast source and transmit guide data to the remote control, wherein the guide data includes data to upgrade manufacturers' display devices, the remote control comprising:

a first display;

a transceiver configured to receive guide data corresponding to a first visual display format corresponding to displaying the guide data on a second display;

a memory configured to store predefined user display preferences;

a processor coupled to the first display, transceiver and memory, the processor configured to:

convert received guide data from the first visual display format to a second visual display format based at least in part on a predefined user display preference, the second visual display format corresponding to displaying at least a portion of the converted guide data on the first display device in a first visual scale and the second visual display format corresponding to formatted text characterized by at least one of edge enhancement and contrast ratio, wherein converting comprises enlarging at least one channel listing of the guide data to an enlarged second visual scale;

display on the first display the at least one enlarged channel listing in the enlarged second visual scale; and display on the first display at least one other channel listing of the received guide data in the first visual scale.

12. The apparatus of claim 11, wherein the received guide data comprises a news alert.

13. The apparatus of claim 11, wherein the second visual display format compensates for at least one of astigmatism and myopia.

14. The apparatus of claim 11, wherein the processor is further configured to:

display simultaneously on the first display the at least one enlarged channel listing in the enlarged second visual scale and the at least one other channel listing in the first visual scale.

15. The apparatus of claim 11 further comprising:

the video signal processor configured to:

perform character recognition on at least a portion of the video data to extract at least a portion of the guide data from the video data;

convert at least a portion of the extracted guide data to computer readable text guide data; and transmit the computer readable text guide data to the remote control.

\* \* \* \* \*